United States Patent [19]

Schwendeman et al.

[11] Patent Number: 4,951,039

[45] Date of Patent: Aug. 21, 1990

[54] ANIMATED DATA DISPLAY INTERLEAVING

[75] Inventors: Robert J. Schwendeman, Pompano Beach; William J. Kuznicki, Coral Springs; Richard E. Johnson, Boca Raton, all of Fla.; David W. Davis, Loudonville, N.Y.

[73] Assignee: Motorola, Inc., Schaumburg, Ill.

[21] Appl. No.: 182,680

[22] Filed: Apr. 18, 1988

[51] Int. Cl.$^5$ .............................................. G09G 3/00
[52] U.S. Cl. ............................... 340/725; 340/825.44; 273/86 R
[58] Field of Search ............... 340/720, 722, 723, 724, 340/725, 747, 825.36, 825.44, 825.46; 273/85 G, 86 R, 148 B; 364/410

[56] References Cited

U.S. PATENT DOCUMENTS

| | | | |
|---|---|---|---|
| 4,324,401 | 4/1982 | Stubben et al. | 340/725 |
| 4,449,114 | 5/1984 | Fascenda et al. | 273/86 R |
| 4,786,902 | 11/1988 | Davis et al. | 340/825.44 |
| 4,788,539 | 11/1988 | Frey | 340/722 |
| 4,803,487 | 2/1989 | Willard et al. | 340/825.44 |
| 4,811,240 | 3/1989 | Ballou et al. | 340/747 |

FOREIGN PATENT DOCUMENTS

2156636 10/1985 United Kingdom ................ 340/725

Primary Examiner—Alvin Oberley
Assistant Examiner—Richard Hjerpe
Attorney, Agent, or Firm—Philip P. Macnak; Vincent B. Ingrassia

[57] ABSTRACT

A portable communications receiver is disclosed having a receiver for receiving and detecting periodically transmitted selective call paging signals and data signals. In response to the selective call paging signal, a decoder generates control signals which allow storage of the data signals in a memory, and the display of the latest stored signals. A graphic characterization is provided for depicting the moving object. The effect of movement of the object is generated as the data signals are periodically updated and displayed. By individually animating the graphic characterization between updates, the effect of movement is enhanced. The data signals are periodically updated and include an absolute position signal for depicting an absolute position of the moving object. The data signals further include a relative position signal for depicting a relative position of the moving object relative to another moving object.

23 Claims, 7 Drawing Sheets

FIG. 2A TRANSMISSIONS >5 MIN PRIOR TO FIRST RACE
| P | S | A1 | A | OFF | P | S | A2 | B | OFF | P | S | A3 | C |

FIG. 2B TRANSMISSIONS 5 MIN PRIOR TO RACE TIME
| P | S | A1 | A | A4 | CD | OFF |

FIG. 2C TRANSMISSIONS DURING RACE
| P | S | A5 | RP(0) | A1 | A | A5 | RP(1) | OFF |

FIG. 2D TRANSMISSIONS AFTER RACE >5 MIN TO NEXT RACE
| P | S | A6 | RR | A1 | A | OFF | P | S | A6 | RR | A2 | B | OFF | P | S | A6 | RR | A3 | C |

FIG. 2E TRANSMISSIONS 5 MIN TO NEXT RACE
| P | S | A1 | A | A4 | CD | OFF |

FIG. 2F

| RP(N) |

| TRACK NAME | RACE # | ABS. POS. | HORSE # | REL. POS. | HORSE # | REL. POS. | HORSE # | REL. POS. | HORSE # | REL. POS. |

ANIMATED DATA DISPLAY INTERLEAVING

FIELD OF THE INVENTION

This invention relates to the field of data display and more particularly to a method and apparatus for displaying received data utilizing animation techniques.

BACKGROUND OF THE INVENTION

There are numerous events which involve the transmission of periodically updated information which is typically provided on a daily basis. Examples of these events include sporting events such as horse racing, dog racing, running, boating events, or the like. For example, in the case of a horse race, the information which is periodically generated and updated includes current odds, time to next race, current race progress and race results. Most of this information is generally unavailable, except by actually attending the event. Occasionally, information such as the current progress and results are available when the event is televised or otherwise broadcast. However, the other information is generally unavailable. In the case of the information being televised, unless a portable television is available, the viewing of such information is limited only to those areas where a television is located. In the case of the information being broadcast, while the information is more generally available because of small portable receivers, the "thrill of the event" becomes lost due to the lack of a visual presentation of the event. There is a need for a device capable of receiving information characterizing moving objects and for displaying this information in a form which can provide animation effects when the information is received, thereby providing a more intelligible display of the information. There is also no current method of alerting the user of the incoming message in a visual manner, other than perhaps by flashing an indicator lamp or icon on an LCD display. There is a need for a positive means of indicating a message has been received to the user.

SUMMARY OF THE INVENTION

It is therefore an object of the present invention capable of receiving and displaying periodically updated information characterizing a moving object.

It is a further object of the present invention to provide animation to the display of the periodically updated information.

It is a further object of the present invention to provide an animated icon depicting a receiver function.

These objects and others which will become apparent are provided in a portable communications receiver having a receiver for receiving and detecting periodically transmitted selective call paging signals and data signals. The data signals are periodically updated and include signals corresponding to an absolute position and a relative position for a moving object. A decoder is provided for decoding the detected selective call paging signals, and for generating control signals corresponding to the received paging signals. A memory is provided for storing the periodically updated data signals. A controller is provided for recalling the latest stored data signals from the memory for display. A scale is provided for depicting absolute position, and a graphic characterization is provided for depicting the relative position of the moving object. As the data is updated, the effect of movement of the object is obtained. The individual graphic characterization is further animated in a manner similar to the object being represented, thereby enhancing the effect of animation.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which:

DESCRIPTION OF A PREFERRED EMBODIMENT

With respect to the figures, FIGS. 1 through 4 illustrate a preferred embodiment of the present invention. A substantial amount of data is generated to completely characterize events such as horse races or other events where moving objects are competing along a track or course having defined start and finish points. The quantity of data can be significantly higher when information pertaining to wagering is also provided. In a preferred embodiment of the present invention, horse racing is characterized, although it will become obvious to one of ordinary skill in the art that other events having similar attributes could be characterized and presented in a similar manner to that of the present invention.

Reference is directed to FIG. 1 which shows a characterization of a horse race as provided by the preferred embodiment of the present invention. A small hand held portable communications receiver having a display provides the means for visualizing the characterization. In this manner, events such as a horse race can be followed without having to actually be at the race track. As shown in FIG. 1A, information which is generated at the race track, is received by the portable communications receiver, in a manner to be described in detail shortly, and displayed. In this case, the information displayed indicates the race track (Horse Valley), the race number (Race #6), and the time to the start of the race, or to the post time (Post Time 2:00 Min). The post time is periodically updated, in intervals such as 30 or 60 seconds, beginning approximately five minutes before the beginning of the race. An indicator, such as a linear scale 100, depicts a graphic representation indicating the race start (S) and finish (F) points, thus providing an absolute indication of the position of the horses along the track. In the preferred embodiment of the present invention, a plurality of predetermined incremental distances, corresponding to position intervals along the track, such as at each sixteenth post, define the horse's absolute position during the course of the race. It will be appreciated the number of position intervals can be more or less depending on such factors as the length of the race the desire to provide the effect of increased animation. In a typical race, this position information is generated approximately every eight seconds, and encoded to provide an absolute position signal for transmission to the portable communications receivers. As shown in FIGS. 1B through 1F, the horse's absolute positions are tracked using linear scale 100.

Figure 1A:
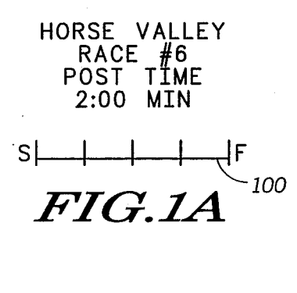
FIGS. 1A-1H are graphic illustrations showing the animation aspects and data presentation of the preferred embodiment of the present invention.
Figure 1B:
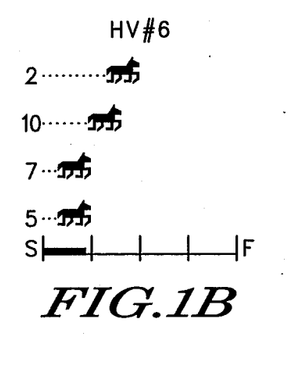
Figure 1C:
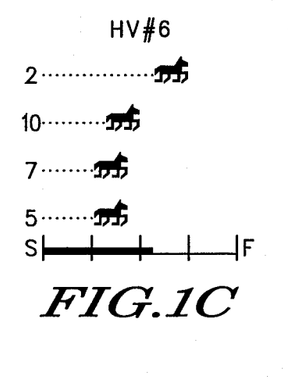
Figure 1D:
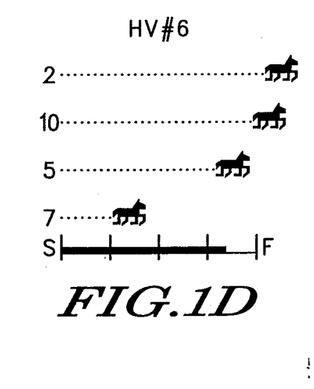
Figure 1E:
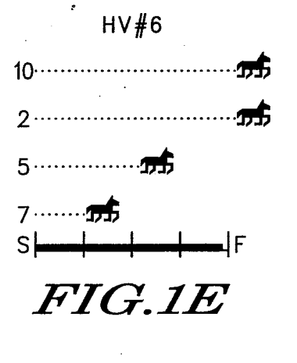
Figure 1F:
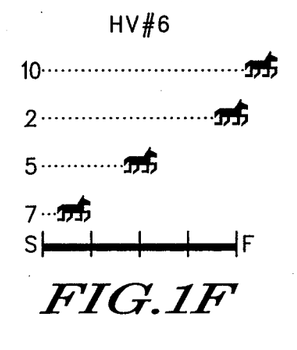
Figure 1G:
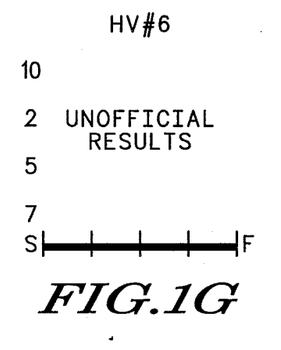
Figure 1H:
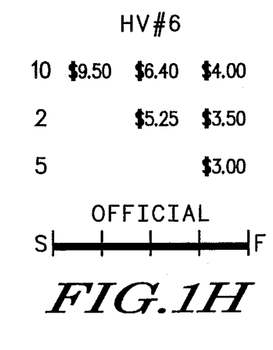

The horses' relative positions to each other are also tracked at each incremental distance, and encoded to provide relative position signals for transmission to the portable communications receivers. As shown in FIGS. 1B through 1F, the horses' relative positions are indicated using graphic characterizations of horses, and while only the four leading horses are tracked for display, this should not to be a limitation of the present invention, as all horses could be tracked and displayed if desired. Relative positions are described in approximate horse lengths, as normally used for a horse race. Thus, as shown in FIG. 1B, horse #2 is leading. Horse #10 is shown approximately one half length behind, and horse #7 and #5 are approximately a full length behind. The graphic characterizations of the horses are further animated to provide real life animation, not specifically shown in the figures. Real life animation is achieved by moving the graphic characterizations' legs, heads, or tails, thus providing additional realism to the display during the time until the next update of the horses positions. While the preferred embodiment of the present invention shows the animation of the objects to be in a left to right or counterclockwise direction, it is clear that a right to left or clockwise direction of travel could also be displayed, such as for events occurring in some foreign countries where the reverse direction predominates. Upon completion of the race, the "unofficial results" are displayed, as shown in FIG. 1G. When the "Official" results become available, they may be suitably encoded for transmission to the portable communications receivers and presented in a manner, such as shown in FIG. 1H.

Reference is now directed to FIGS. 2A-2F which show the selective call paging signalling and data signal formats for transmission of the information for the horse races. In the preferred embodiment of the present invention, the signalling format described uses one of the well known binary paging formats, such as the Golay Sequential Code (GSC) format provided by Motorola. Other signalling formats, such as the POCSAG signalling format could be used as well.

Five basic selective call paging signalling and data signal formats are shown in FIGS. 2A through 2E. These formats provide for transmission of the events occurring at various times throughout the day of a race. All transmissions are prefaced with a preamble (P), start code (S), and one of a plurality of addresses (A1-A6), as in a typical GSC data page. All portable communications receivers within the system have a common set of addresses with respect to their ability to receive the race information from a particular track. Information relating to different tracks or events can be handled using different addresses and/or receiver operating frequencies. All data transmissions are handled using standard GSC data blocks, with the number of data blocks transmitted for each type of information being dependent upon the information content.

Figures 2A, 2B:
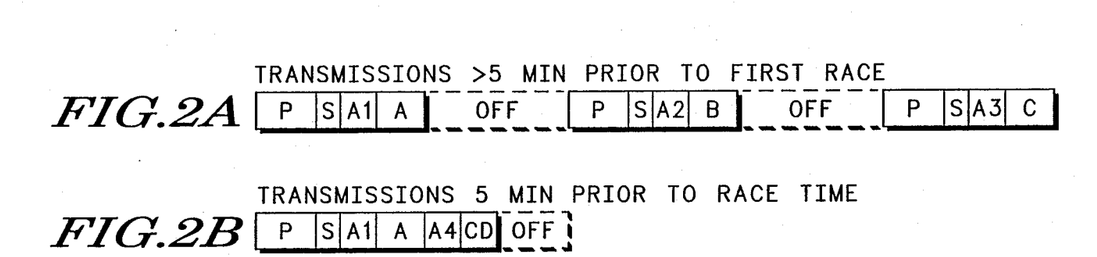
FIGS. 2A-2F are timing diagrams showing the selective call paging signalling and data transmission formats for the preferred embodiment of the present invention.

Reference is directed to FIG. 2A which shows the transmissions prior to the first race of the day. The race information covering all of the days races is sent out in three data groups: Group A (A), Group B (B) and Group C (C). The information in Group A covers such items as the odds, race site, horse numbers, scratches, track conditions, etc. on the first five races. Group B covers the next five races, and Group C covers the last five, or balance of the races. All group information is transmitted once every approximately thirty seconds. Each group is preceded by a different unique address (A1), (A2), or (A3) which identifies to the portable communications receivers the nature of the information being received, and the memory areas in which the information is to be stored. As information is updated and received, the latest information is allowed to overwrite the previous information. It should be noted that as the day progresses, only the information for the races remaining is transmitted and allowed to overwrite the stale information. Previous information on past races remains unchanged. The off time shown is present as the information transmitted requires less than the thirty seconds to the next information update.

Figure 2C:
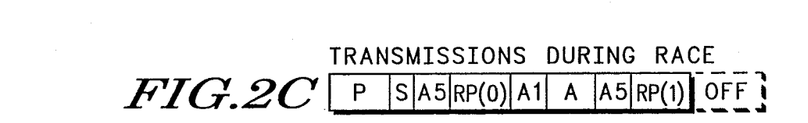

Reference is now directed to FIG. 2B which shows the details of the transmissions starting approximately five minutes before the first race. Information from the first five races, or Group A (A) are periodically updated and transmitted on an approximately thirty second interval, as previously stated. In addition, address (A4) is transmitted followed by the post time count down (CD). The count down is displayed on the portable communications receivers, indicating the time remaining to the start of the race. At the start of the race, the user can be alerted in an audible or tactile manner, as well as at other important times, as indicated by receiving certain data signals. Race progress information is then transmitted to the portable communications receivers, as shown in FIG. 2C. An additional address (A5) precedes the race progress data (RP(N)) which is updated on an approximately eight second interval as previously described. Sixteen or more updates, depending on the length of the race, will be received and displayed on the portable communications receivers, as previously described, although it will be appreciated other events may require a greater or lesser number of updates to characterize the progress of the event.

Figure 2D:
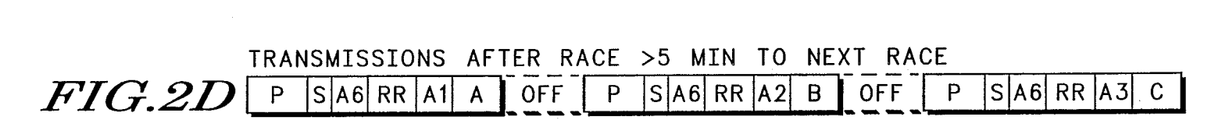
Figure 2E:
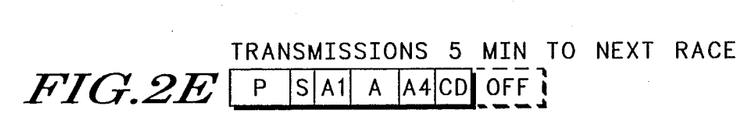
Figure 2F:
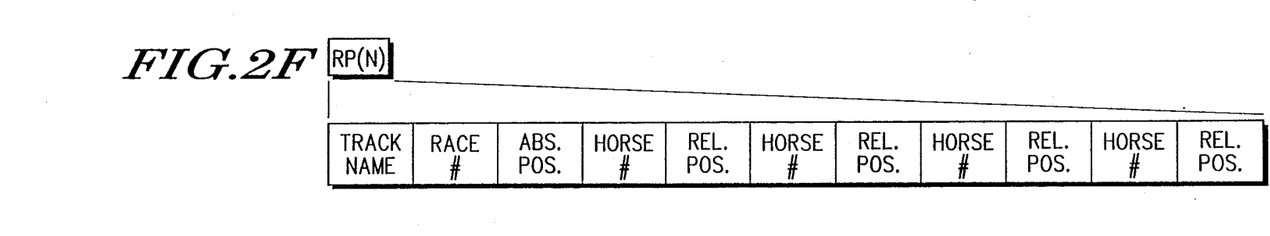

The race progress information is shown in detail in FIG. 2F. As shown in FIG. 2F, the Track Name, Race #, current absolute position, and top four horses and their current relative positions are transmitted. Information as it is received by the portable communications receivers is stored in a section of memory distinct from that used to store the odds information, as will be described in detail later. In this manner, it is possible to allow a complete replay of the completed race. In the preferred embodiment of the present invention, as each new race occurs, a separate address A7 (not illustrated) is transmitted clearing the race progress memory at post time. It will be appreciated that if sufficient memory were provided in the receiver, the results of all races could be individually stored and recalled for review.

Reference is directed to FIG. 2D which shows the transmissions after the first race and all races thereafter.

An additional address (A6) precedes the transmission of the race results (RR), followed by sequential updates the information on the balance of the races (A) or (B) or (C). A separate section of memory is allocated to store the race results (RR), and each time the race results (RR) are updated and transmitted, the information from all previously concluded races including the most currently run race is transmitted. This allows portable communication receivers which have been turned on some time after the start of the races to become current with the results of all completed races for the day. Race information is thereafter continually updated and transmitted as shown in FIGS. 2C through 2E, as previously described. It will be appreciated from the heretofore provided description the use of data signals transmitted in a coding format as described, in conjunction with displayed characterizations depicting moving objects, can provide an efficient method of transmitting information for display which normally requires substantially greater information content.

Figure 3:
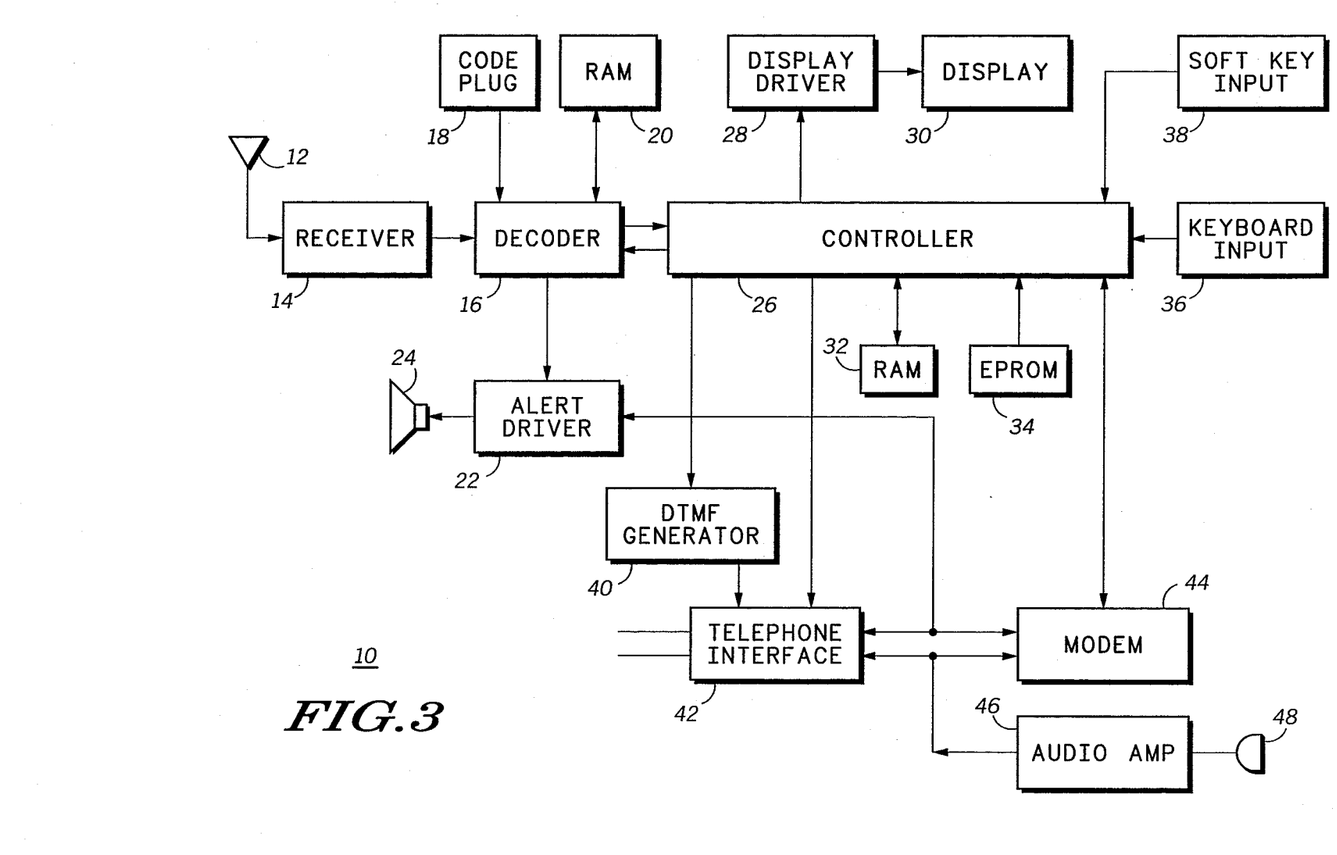
FIG. 3 is an electrical block diagram of the portable communications receiver of the preferred embodiment of the present invention.

Reference is directed to FIG. 3 which shows an electrical block diagram of a portable communications receiver 10 constructed in a manner of the preferred embodiment of the present invention. Portable communications receiver 10 comprises an antenna 12 coupled to a receiver 14 for receiving and detecting the transmitted selective call paging signals and periodically updated data signals. The format of the transmission of these signals was previously described. In the preferred embodiment of the present invention, receiver 14 is an FM receiver, the construction of which is well known to one of ordinary skill in the art. A serial stream of digital data is provided at the output of receiver 14 corresponding to the selective call paging signals and the periodically updated data signals received. The selective call paging signals are coupled to decoder 16 which compares these signals with a plurality of predetermined addresses stored in code plug 18, to which the portable communication receiver is responsive. In the preferred embodiment of the present invention, decoder 16 is implemented using a microprocessor, such as a 68HC05C04 manufactured by Motorola, in a manner well known to one of ordinary skill in the art. Code plug 18 is preferably implemented using an electrically erasable programmable read only memory (EEPROM).

When the selective call paging signals match one of the predetermined addresses, control signals are generated by decoder 16 enabling either the generation of a sensible alerting signal, or causing the storage and display of the received data signals corresponding to the nature of the information received as determined by the received address as previously described. Decoder 16 generates the alerting signal which is coupled to alert driver 22 for reproduction by transducer 24, as in the case of an audible alert, or to a vibrator (not shown), as in the case of a tactile alert. RAM 20 which is coupled to decoder 16 is used to store conventional paging messages, when the portable communication receiver is configured to receive such messages.

Figure 4A:
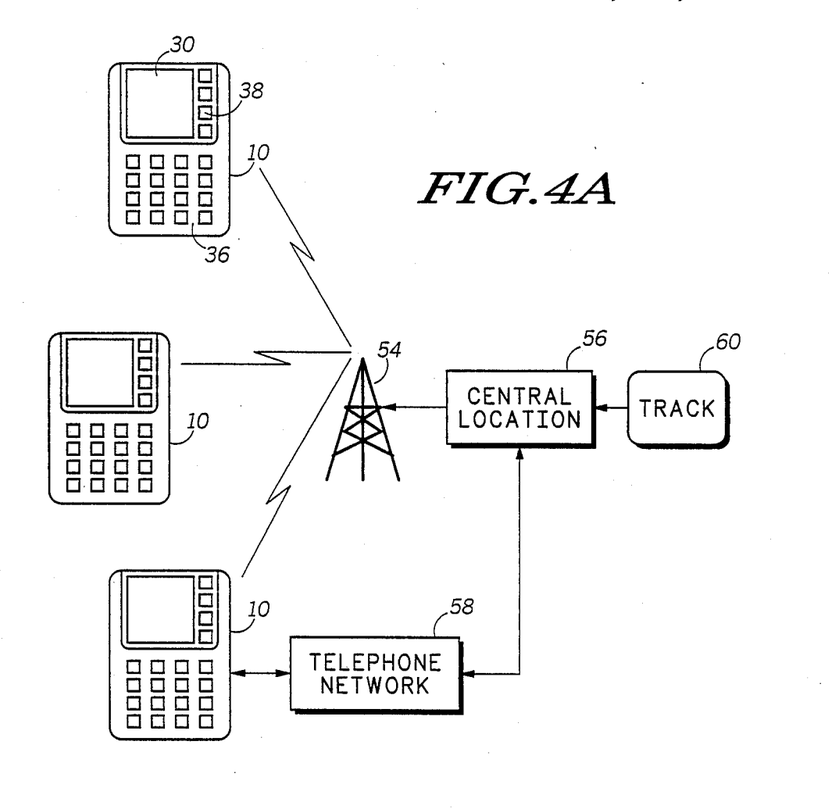
FIG. 4A is a block diagram showing the portable communications receivers operating in a typical system depicting the preferred embodiment of the present invention.
Figure 4B:
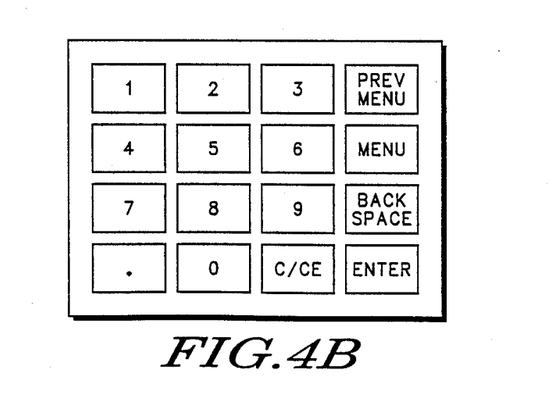
FIG. 4 is a plan view showing the keyboard input layout for the preferred embodiment of the present invention.

Race information received is stored in a memory comprising RAM 32 under the control of controller 26 which is responsive to the plurality of control signals generated by decoder 16. Controller 26, in the preferred embodiment of the present invention is implemented using a microprocessor, such as a 6301X as manufactured by Hitachi. RAM 32 is a 32K random access memory, such as an F2256 also manufactured by Hitachi. Access to the information stored in RAM 32 is dependent upon the nature of the information required. Race progress information is generally automatically displayed on the display as soon as the race starts, unless display of other information stored in memory is initiated. All information stored in RAM 32 can be accessed through a keyboard input 36 which is used to select various menus which allow display of the stored information. Once a menu has been selected, an additional soft key input 38 allows the user to select additional functions under program control. Thus, the switches, in conjunction with controller 26, provide a means for recalling or replaying the stored data signals. In the preferred embodiment of the present invention, keyboard input 36 is a four by four switch array providing numeric data input and specific menu selection buttons as shown in FIGS. 4A and 4B. Soft key input 38 consists of four switches configured as also shown in FIG. 4A.

EEPROM 34 contains all the firmware routines and instructions required by controller 26 which is required to store and to display the received information. EEPROM 34 also contains all of the menus required to select the readout of stored information. EEPROM 34 contains the graphic representations for absolute position and the graphic characterizations of the moving objects and real life animation effects of the moving objects. EEPROM 34, in conjunction with controller 26, provide a processing means for generating the graphic characterization and indicator corresponding to the relative and absolute position signals under control of the decoder 16 control signals. EEPROM 34 is implemented using a 64K 27C12 EEPROM as manufactured by Fujitsu for the preferred embodiment of the present invention.

Information which has been selected for display from RAM 32 is displayed by a display means comprising display driver 28 and display 30 under the control of controller 26. In the preferred embodiment of the present invention, display driver 28 is implemented using an HD61830B driver IC as manufactured by Hitachi. Display 30 is implemented with a 96 pixel wide by 64 pixel high liquid crystal display (LCD) which provides the graphics capability for displaying the received data, as well as for displaying the animated race progress, as shown in FIG. 1. Numeric information is displayed in a 5 by 7 pixel format, whereas the graphic representations of the moving objects, such as horses, are displayed by selectively using a 12 by 20 pixel format, thus allowing the display of 4 horses and text, as shown in FIG. 1. Larger LCD screen sizes would provide for increased text and/or numbers of horses being displayed.

The portable communications receivers of the present invention, in addition have means for coupling to a telephone network for receiving and communicating additional information directly to a central location, such as at the track, as would be required for wagering. An RJ11 jack is provided on the unit for coupling to the telephone network. A DTMF generator 40 couples to a telephone interface 42, allowing for dialing the central location, under control of controller 26. Audible confirmation of the dial tone and dialing is accomplished through alert driver 22 and transducer 24. In the preferred embodiment of the present invention, DTMF generator 40 is implemented using a PCD 3311 IC as manufactured by Signetics, and telephone interface 42 is implemented using a TEA1067 IC also manufactured by Signetics.

Information which has previously been entered into memory from keyboard input 36 can be downloaded to the central location via modem 44 and telephone interface 42. This would allow the direct placement of wagering or for other related functions. Information from the central location can also be directly downloaded into the portable communications receivers memory. In the preferred embodiment of the present invention, modem 44 is implemented using an MC145443 IC as manufactured by Motorola.

When required, verbal communications with the central location is available via audio amp 46 and microphone 48 through telephone interface 42. Verbal responses are handled through telephone interface 42 and alert driver 22 and transducer 24. It will be appreciated, when high quality audio communications is required, a separate audio amplifier and voice quality speaker can be coupled to telephone interface 42.

It should be noted that information can be received over the radio frequency communications channel while information is being transmitted or received over the telephone network. In addition, the periodic updates can be received over the radio frequency communications channel while information, such as the replay of the previous race is being displayed on the display. When the previous race information is replayed, it can be accomplished at a rate faster than received, such as at one or two second intervals per data update, thereby enhancing the animation effects of the previously received race. In other instances where information is received more rapidly, it may also be beneficial to replay information at a slower rate than received. In the case a previous race is being displayed when a new race has commenced, the previous information is erased, as previously described, and replaced with the newly received and updated race progress information.

Reference is now directed to FIG. 4A which shows a block diagram of a system incorporating the communications receiver of the present invention. In this example, three portable communications receivers 10 are shown receiving selective call paging signals and the periodically updated data signals transmitted via transmitter 54 from central location 56. In addition, one of the portable communications receivers 10 is also coupled via its RJ11 connector to telephone network 58 for communications to central location 56. The absolute position and relative position signals which are periodically updated during the course of the race at track 60 are encoded and formatted at central location 56 for transmission to the portable communications receivers 10 as previously described. Other information pertaining to the race in progress or future races are also encoded and formatted for transmission at central location 56 as previously described. Information stored in portable communications receiver 10 is recalled for review, and previously run races can be replayed via keyboard input 36 and additional soft key input 38. In the preferred embodiment of the present invention, keyboard input 36 contains keys for numeric entry (0-9), a decimal key (.), a clear/clear entry key (C/CE), and four fixed menu keys. The fixed menu keys include previous menu (PREV MENU), menu selection (MENU), back space for entry correction (BACK SPACE), and an enter selection key (ENTER) as shown in FIG. 4B. Soft key input 38 uses display 30 for identification of the key functions. Soft key functions are dependent upon the menu selected.

Figure 5A:
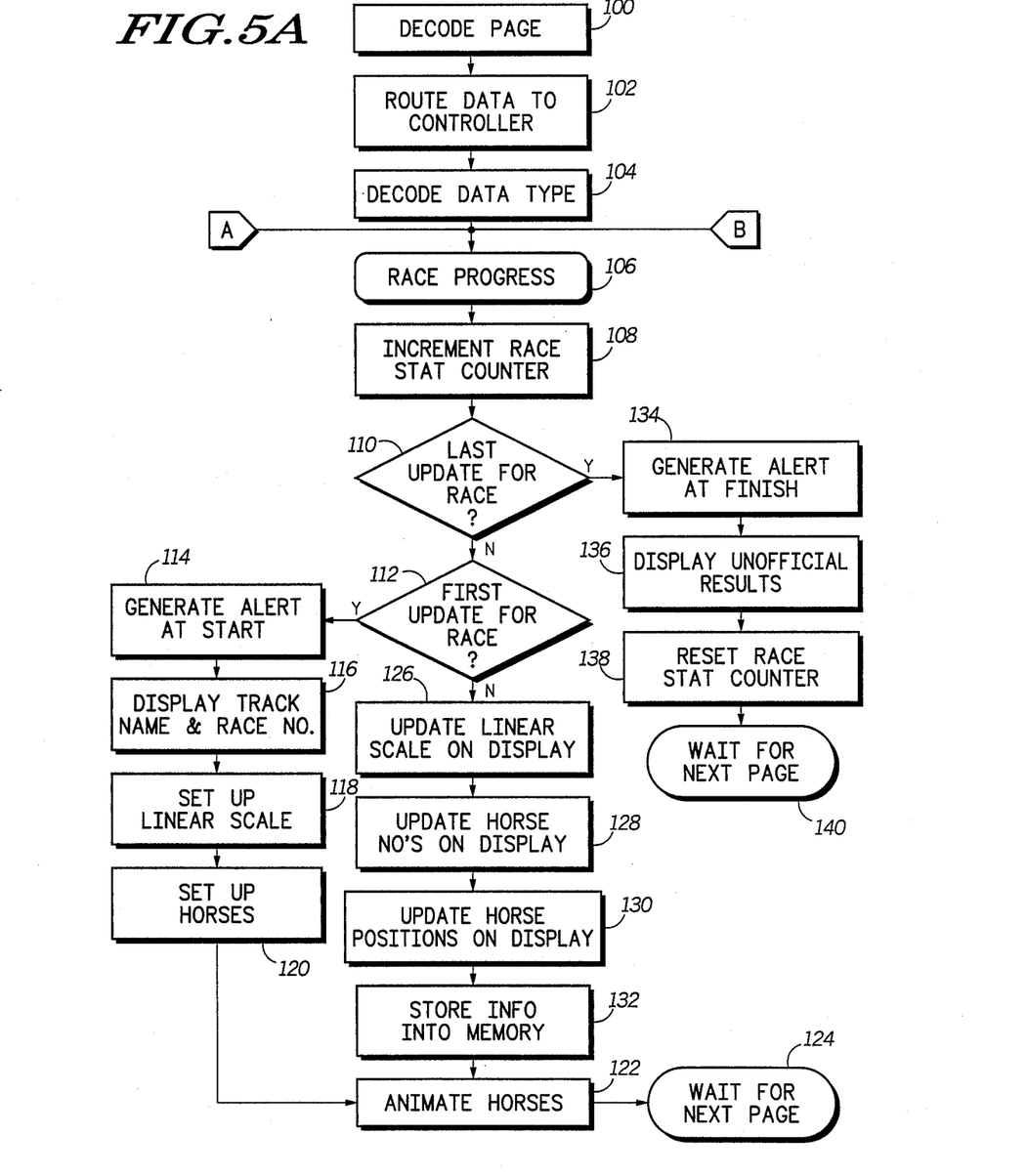
FIGS. 5A-5C are flowcharts showing the handling of data in the preferred embodiment of the present invention.
Figure 5B:
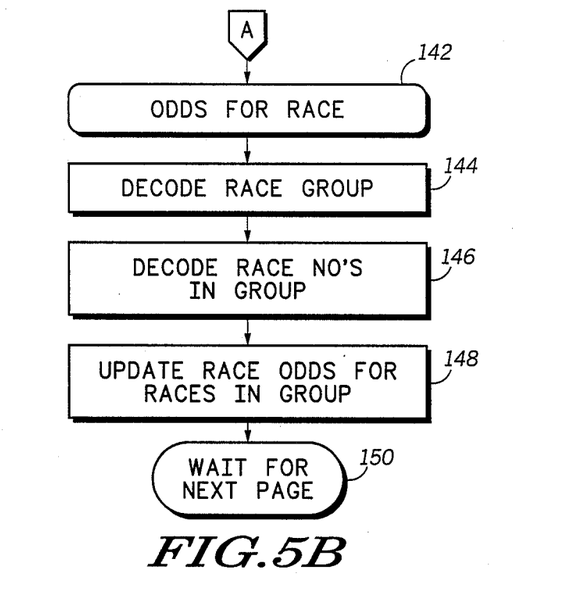

FIG. 5A is a flowchart showing the operation of the preferred embodiment of the present invention. As data is received by portable communications receiver 10, the selective call paging information, or page, is decoded as shown in block 100. The data signals are routed to controller 26, as shown at block 102. Controller 26 decodes the data type, dependent upon which address was received, as shown at block 104. Three basic data types are handled: race progress as shown at block 106, odds for race as shown at block 148 of FIG. 5B, and race results as shown at block 158 of FIG. 5C.

Returning to FIG. 5A, when the data type for race progress has been decoded as shown at block 106, the stat counter is incremented, indicating the first update has been received, as shown at block 108. Controller 26 checks to see if this is the last update for the race, as shown at block 110. Since this is not, the controller then checks to see if this is the first update for the race, as shown at block 112. Since this is the first update of the race, controller 26 initiates an alert indicating the start of the race, as shown at block 114, by enabling decoder 16 to generate the alert. The data corresponding to the track name and race number are displayed as shown in FIG. 1B, as shown at block 116. The linear scale 100 is set up displaying the horses initial absolute position, as shown at block 118, and the horse characterizations are set up on the display, as shown at block 120. Since there is a delay of approximately eight seconds to the next race progress update, the horses are animated in their initial positions, as shown at block 122. The portable communication receiver 10 then waits for the next page containing the update to be received, as shown at block 124.

When the next page is received, the data is processed as previously described for blocks 100 through 112. Since this is not the last update or first update, linear scale 100 is updated reflecting the new absolute position, as shown at block 126. The horse numbers and relative positions are updated, as shown at blocks 128 and 130, and the information is stored in memory for later review, as shown at block 132. The horses are again animated, as shown at block 122, and the portable communications receivers continue to wait for the next page, as shown at block 124.

When the last update is received for the race, as shown at block 110, controller 26 initiates an alert, as previously described, as shown at block 134, indicating the completion of the race. The unofficial results are displayed as shown in FIG. 1G, as shown at block 136. The race stat counter is reset, initializing it for the start of the next race, as shown at block 138, and the portable communications receivers again wait for the next page, as shown at block 140.

Figure 5C:
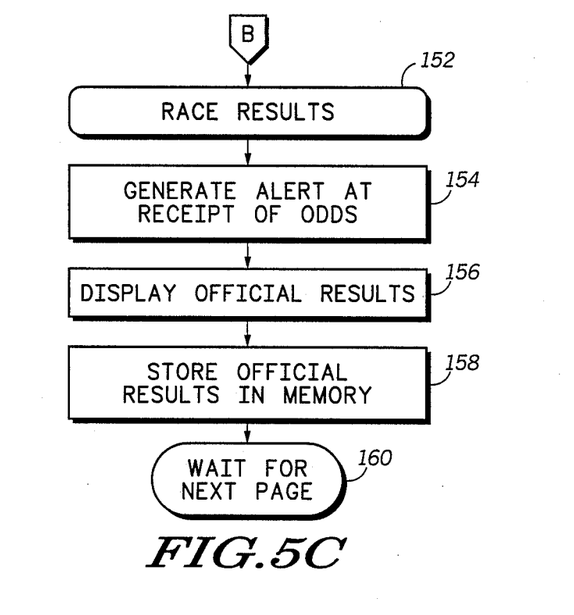

When the next page is received, it will have been determined by its data type, that the official race results have been received, as shown at block 152 of FIG. 5C. An alert is initiated by controller 26, as previously described, indicating receipt of the official results, as shown at block 154. The official results are then displayed, as shown in FIG. 1H, overwriting the unofficial results, as shown at block 156, and also stored in memory, as shown at block 158. The portable communications receivers then wait for the next page, as shown at block 160.

Transmissions prior to each race update the odds, and other information, for the remaining races. When the page is received indicating that the odds for the races are being updated, as shown at block 142 of FIG. 5B, controller 26 first decodes the race group to which the information pertains, as shown at block 144. Since not all race numbers are transmitted once the race has been run, controller 26 decodes the remaining race numbers in the group received, so as to not overwrite the final results stored in memory, as shown at block 146. The odds for the races remaining in the group are updated and stored in memory, as shown at block 148, after which the portable communications receivers 10 again wait for the next page, as shown at block 150.

Recapping, a portable communications receiver has been described which allows data relating to moving objects in events having defined start and finish points, to be received and displayed. When the information is displayed, an absolute position for the moving objects is displayed along with the relative positions of some or all of the moving objects in the event. Updates to the position of the moving objects are periodically provided at intervals suitable for providing animation of the event on the display. During the period between updates of information, the moving objects that have been positioned on the display are additionally animated in a manner characterizing real life movement of the actual object. While a horse race has been used to characterize the preferred embodiment of the present invention, it will be obvious to one of ordinary skill in the art that other events, including such other events as football, basketball and baseball games, may be characterized in a similar manner and displayed in the manner of the present invention.

Figure 6A:
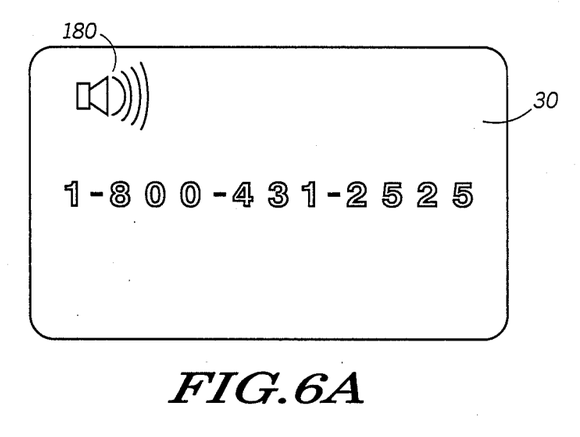
FIGS. 6A-6C illustrate an alternate embodiment of the present invention.
Figure 6B:
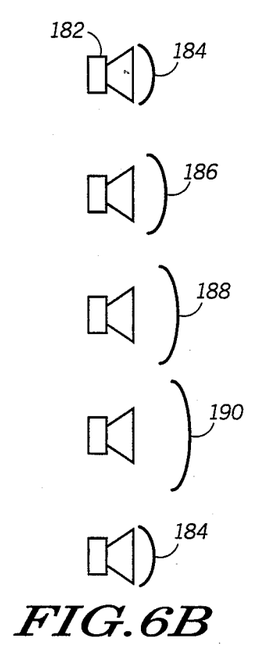
Figure 6C:
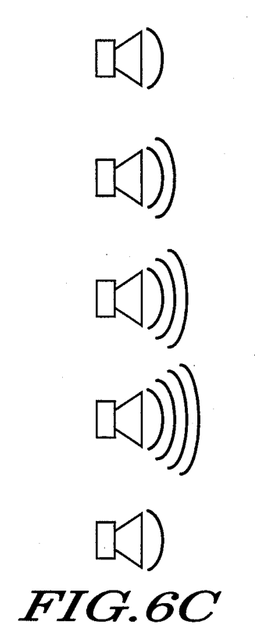

There are other situations where sufficient information can be transmitted to the portable communication receiver to generate animation of the display solely based on the receipt of the address. By coupling particular portable communications receiver addresses to particular animation patterns, a new dimension for data transmission is provided. An example of this is shown in FIGS. 6A through 6C, which show an alternate embodiment of the present invention. FIG. 6A shows the display of the portable communications receiver as it would look after a page has been received. An icon 180, in this case a speaker shown emitting sound, could be used to alert the user in lieu of actually generating an alert tone output. FIGS. 6B and 6C illustrate several methods of animating icon 180 to provide an alerting function when the selective call paging signals are received and decoded by portable communications receiver 10. In the example of FIG. 6B, speaker symbol 182 is normally displayed while sound emitting indications 184-190 would normally not be displayed. Decoding of selective call addresses for alerting and receipt of numeric or alphanumeric information to be displayed is well known to one of ordinary skill in the art. Upon receipt of the selective call paging signal, data describing the animated icon, in this case an animated alert pattern characterized by increasing sound emitting indications 184-190 which is stored in a read only memory, such as EEPROM 34, would be sequentially recalled by controller 26. By repeating this pattern for the icon, an animated icon representing a visual alert would be generated. FIG. 6C shows a variation on this animated alert pattern. The visual alert pattern can be used to alert a user a message has been received when the portable communication receiver is in a silent mode, or when it is used in a high noise environment as might be encountered at a horse race. The animated icon representing a receiver function would be especially useful for visually alerting a handicapped person, such as one who is hearing impaired. Coupled with animation of received data, a versatile means of data communications is possible. While only an animated icon describing the alerting function of a communications receiver has been described, it will be clear to one of ordinary skill in the art that there are many receiver functions which are audibly or visually annunciated which may be more descriptively annunciated with the use of an animated icon.

Additionally, there are many events which occur on an ongoing basis do not have start or finish positions, such as in tracking traffic density patterns at an intersection. Such events would be displayed on an ongoing basis solely relying on relative position signals periodically generated. Other information, such as often encountered in processes which are often metered activities, would be displayed solely on the basis of variations in the absolute magnitude of the parameter being periodically measured. The indicator in these situations do not represent start or finish conditions, but rather upper or lower limit conditions. In each of these cases, different graphic characterizations can be provided in the portable communications receiver to provide a meaningful display animating the event being tracked.

While specific embodiments of this invention have been shown and described, further modifications and improvements will occur to those skilled in the art All modifications which retain the basic underlying principles disclosed and claimed herein are within the spirit and scope of the present invention.

We claim:

1. A portable communications receiver comprising:
   a receiver for receiving and detecting transmitted selective call paging signals and periodically updated data signals, the data signals indicating the present position of a plurality of moving objects each time the data signals are updated;
   a decoder, responsive to the detected selective call paging signals, for generating control signals in response thereto;
   display means; and
   processing means, coupled to said display means and responsive to the control signals and periodically updated data signals, for generating for display graphic characterizations depicting the moving objects, wherein movement of the displayed graphic characterizations is produced when the periodically updated data signals representing the present position of the moving objects are received and displayed.

2. The portable communications receiver according to claim 1, wherein said graphic characterization is displayed and individually animated during the time interval between the periodic updates of the data signals.

3. The portable communications receiver according to claim 1, wherein the data signals include relative position signals indicating the relative positions of each of the plurality of moving objects, and wherein said processing means is responsive to the relative position signals for generating graphic characterizations corresponding to each of the relative position signals.

4. The portable communications receiver according to claim 3, wherein the relative position signals correspond to the actual position of each of the plurality of moving objects measured relative to another of the plurality of moving objects.

5. The portable communications receiver according to claim 1, wherein said data signals further include an absolute position signal being periodically generated for indicating an absolute position of a predetermined one of the moving objects, and wherein said processing means is responsive to the absolute position signal for generating an indication depicting the absolute position of the one predetermined moving object which is displayed as a scale.

6. The portable communications receiver according to claim 5, wherein said scale comprises a bar graph-type display having a plurality of predetermined incremental positions spaced between a start and a finish reference.

7. The portable communications receiver according to claim 6, wherein the absolute position signals periodically generated corresponds to each of the plurality of predetermined incremental positions spaced between the start and the finish reference.

8. The portable communications receiver according to claim 1, wherein said processing means comprises:
   a memory; and
   a controller coupled to said decoder, said display means, and to said memory, and responsive to the control signals for effecting the sequential storage of the periodically updated data signals, and further for effecting the recall for display of the last stored updated data signals from said memory.

9. The portable communications receiver according to claim 8, wherein said controller is coupled to a keyboard input which enables selecting the sequential recall of the stored data signals at a rate faster than originally received, thereby enhancing the effect of movement of the moving object as the stored data signals are sequentially recalled.

10. The portable communications receiver according to claim 8, wherein said display means comprises:
    a graphic display for displaying the stored data signals; and
    a display driver, coupled to said graphic display and to said controller, for driving said graphic display in response to said controller providing the stored data signals from said memory.

11. The portable communications receiver according to claim 1, further comprising alerting means, responsive to the control signals, for generating a sensible alert in response to certain of the selective call paging signals.

12. The portable communications receiver according to claim 11, wherein the sensible alerting signal generated is audible.

13. The portable communications receiver according to claim 11, wherein the sensible alerting signal generated is tactile.

14. A method for providing an animated display of a current event involving a plurality of moving objects using a portable communication receiver having a graphic display, said method comprising the steps of:
    periodically updating an absolute position of a predetermined one of the plurality of moving objects at a plurality of incremental positions between a start and a finish point, and generating absolute position signals in response thereto;
    transmitting selective call paging signals and periodically updated data signals, wherein said data signals include said absolute position signals;
    receiving the paging signals and the data signals at the portable communication receiver;
    displaying the updated absolute position signals with a scale comprising a bar graph-type display having a plurality of predetermined incremental positions spaced between a start and a finish reference, thereby providing the current position of the predetermined moving object as the absolute position signals are periodically updated.

15. The method for providing an animated display according to claim 14, said method further comprising the steps of:
    providing graphic characterizations for each of the plurality of moving objects;
    generating data signals which include relative position signals for each of the plurality of moving objects at each of the plurality of incremental positions and transmitting the same;
    receiving the data signals including said relative position signals with the portable communication receiver; and
    displaying the relative position signals as the graphic characterization depicting each of the moving objects, whereby animation of the objects on the display is effected as the relative positions of the moving objects are periodically updated and displayed.

16. The method according to claim 15 further comprising the step of individually animating each of the graphic characterizations depicting the moving objects while the positions of the moving objects are being periodically updated.

17. A method for providing a display of the position of at least two moving objects participating in an event using a portable communication receiver having a graphic display, said method comprising the steps of:
    providing graphic characterizations depicting the moving objects;
    receiving selective call paging signals and periodically updated relative position signals indicating the relative position between the moving objects at the portable communication receiver; and
    displaying the relative position signals as the graphic characterizations depicting the moving objects, wherein movement of the displayed graphic characterizations is produced when the relative position signals representing the present positions of the moving objects are received and displayed.

18. The method according to claim 17 further comprising the step of individually animating each graphic characterization depicting the moving objects between intervals during which the relative position signals are being periodically updated.

19. A portable communications receiver comprising:
    a receiver for receiving and detecting transmitted selective call paging signals;
    a decoder, responsive to the detected selective call paging signals, for generating control signals in response thereto;
    processing means, responsive to the control signals, for sequentially generating a sequence of icon segments depicting a receiver function; and
    display means, coupled to said processing means for displaying said sequentially generated sequence of icon segments, whereby an animated visual indication of the receiver function activated in response to the selective call signals is provided on said display means.

20. The portable communications receiver according to claim 19, wherein said processing means comprises:
    an read only memory, for storing data describing said sequence of icon segments; and
    a controller, coupled to said read only memory and responsive to the control signals, for sequentially accessing said data describing said sequence of icon segments from said read only memory for display.

21. The portable communications receiver according to claim 20, wherein said display means comprises:
   a display for displaying the stored sequence of icon segments; and
   a display driver, coupled to said display and to said controller, for driving said display with said sequentially accessed sequence of icon segments.

22. The portable communications receiver according to claim 20, wherein said read only memory is an electrically erasable read only memory.

23. A method for animating a display providing an indication of a receiver function, said method comprising the steps of:
   receiving and decoding a selective call paging signal and providing control signals in response thereto;
   sequentially accessing a sequence of icon segments stored in a memory indicating the receiver function; and
   displaying the sequentially accessed sequence of icon segments, thereby providing the effect of animation of the receiver function icon.

* * * * *